April 28, 1959     W. B. FRASER     2,883,768
GLOBAL EXHIBITOR

Filed Nov. 13, 1956     6 Sheets-Sheet 1

INVENTOR.
WALTER B. FRASER
BY
*Albert J. Kramer*
ATTORNEY

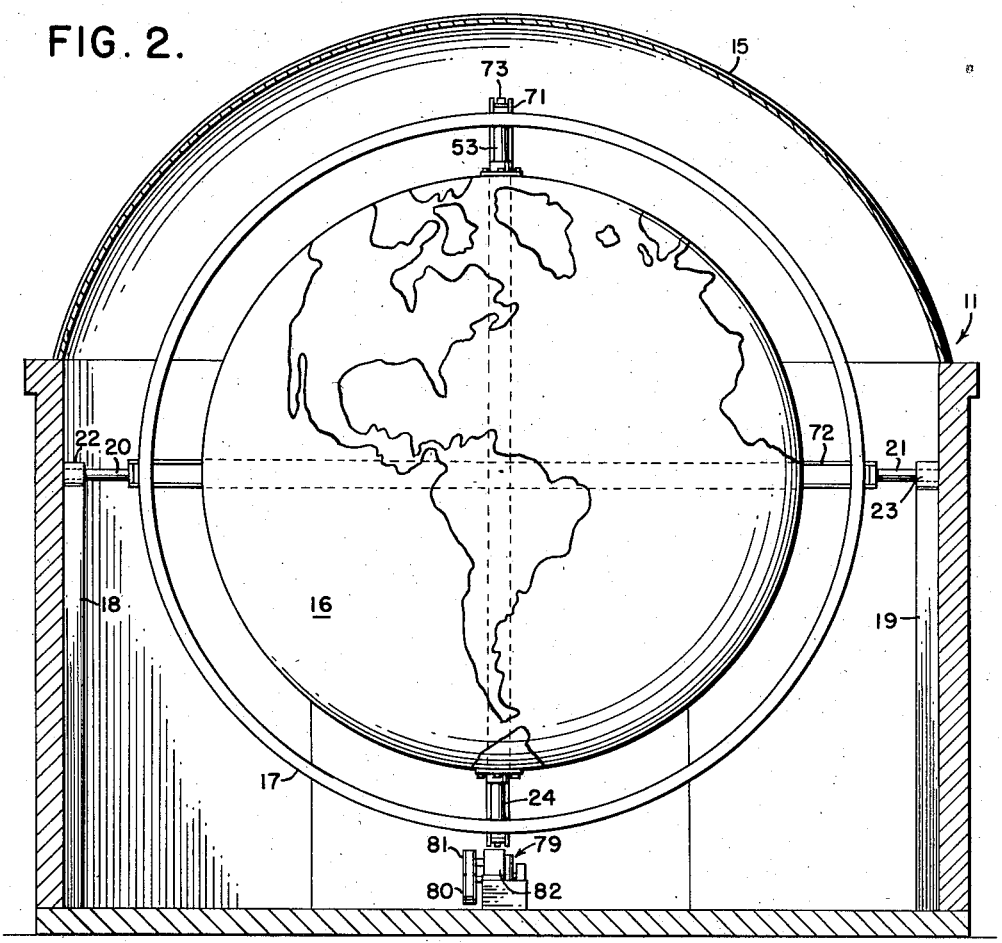
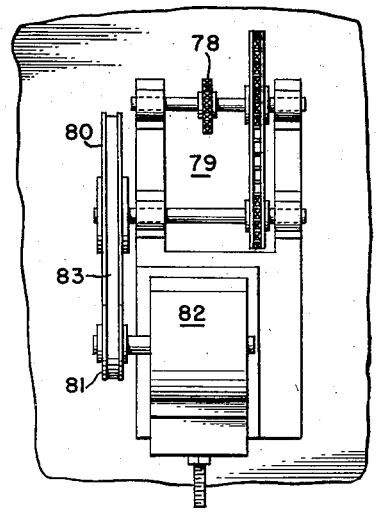

April 28, 1959  W. B. FRASER  2,883,768
GLOBAL EXHIBITOR

Filed Nov. 13, 1956  6 Sheets-Sheet 3

INVENTOR.
WALTER B. FRASER
BY
Albert J. Kramer
ATTORNEY

April 28, 1959 W. B. FRASER 2,883,768
GLOBAL EXHIBITOR
Filed Nov. 13, 1956 6 Sheets-Sheet 4

INVENTOR.
WALTER B. FRASER
BY
Albert J. Kramer
ATTORNEY

April 28, 1959     W. B. FRASER     2,883,768
GLOBAL EXHIBITOR

Filed Nov. 13, 1956     6 Sheets-Sheet 5

INVENTOR.
WALTER B. FRASER
BY
*Albert J. Kramer*
ATTORNEY

April 28, 1959 — W. B. FRASER — 2,883,768
GLOBAL EXHIBITOR
Filed Nov. 13, 1956 — 6 Sheets-Sheet 6

INVENTOR.
WALTER B. FRASER
BY
Albert J. Kramer
ATTORNEY

United States Patent Office 2,883,768
Patented Apr. 28, 1959

2,883,768

GLOBAL EXHIBITOR

Walter B. Fraser, St. Augustine, Fla., assignor to Fountain of Youth Properties, Inc., St. Augustine, Fla., a corporation of Florida Application November 13, 1956, Serial No. 621,775

3 Claims. (Cl. 35—46)

This invention relates to a device for exhibiting or displaying various items of interest in relation to the geography of the earth, such as items of historical, military, commercial, sociological, scientific, political, archeological, or other subjects.

One of the objects of this invention is the provision of such a device which can be viewed by a large class or group of persons simultaneously.

Another object of the invention is the provision of a geographical globe so mounted in relation to an observation area or auditorium and provided with such means for orienting it that any desired part or parts of the globe may be viewed by the observers in the auditorium simultaneously for mass demonstration or instruction without the observers having to move throughout the course of the instruction or demonstration.

A further object of the invention is the provision of such a global demonstrator, a mounting therefor in relation to an observation area or auditorium and remote control means for rotating the globe on axes thereof at right angles to each other so as to bring into view of persons in the auditorium any part of the globe.

A still further object of the invention is the provision of such a globe which is relatively large in comparison to the size of a person and which, when viewed by persons in the observation space, overawes or dominates the persons and tends to create the impression that they are in outer space looking at the earth, such as, from an artificial satellite near the earth.

These and other objects, advantages, and features of the invention will appear more fully from the following description considered together with the accompanying drawing.

In the drawing:

Fig. 2 is a vertical sectional view along the line 2—2 of the housing.

Fig. 11 is a plan view of the driving mechanism at the bottom of Fig. 4.

Figure 1:
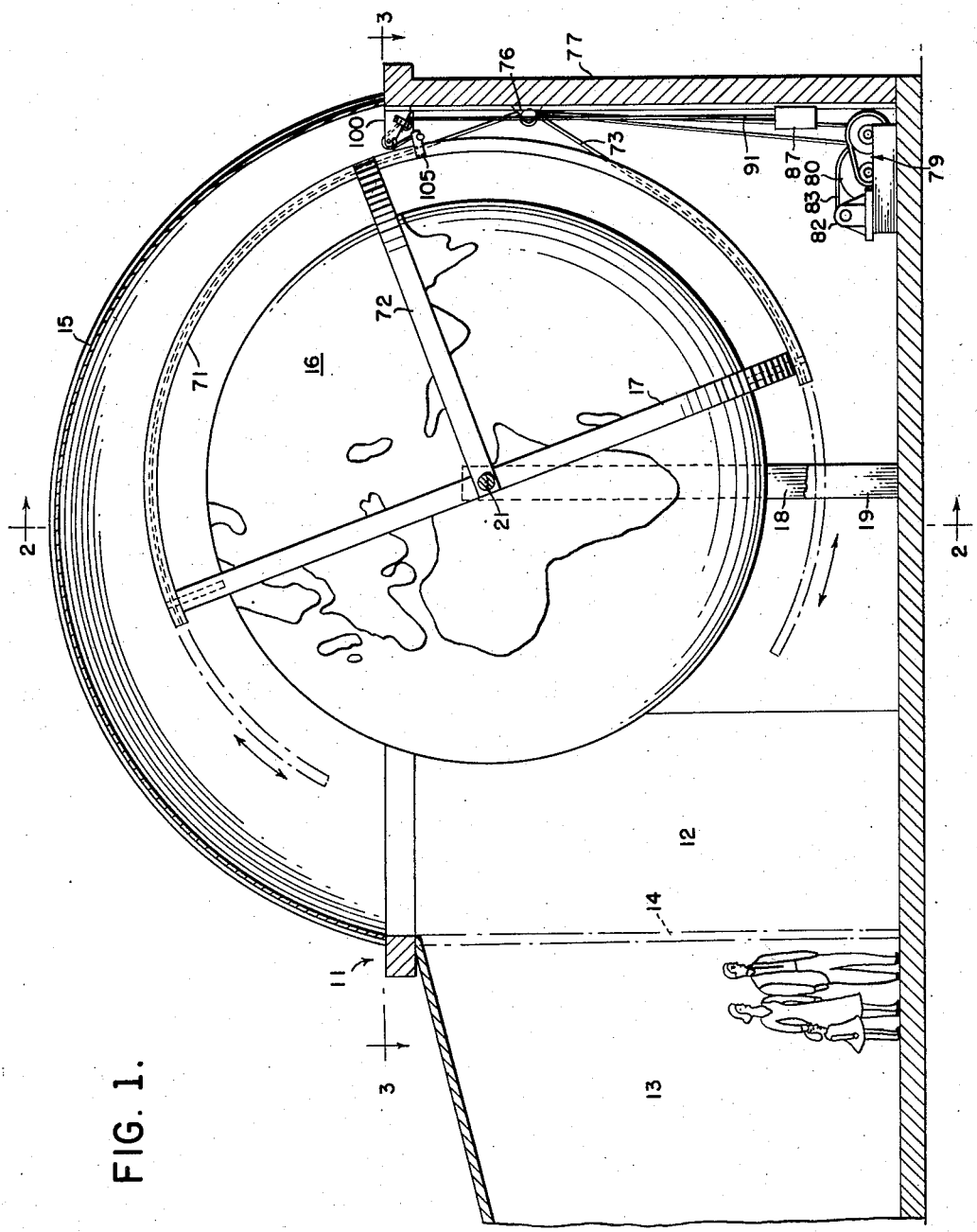
Fig. 1 is a cross-sectional view through the housing, partly broken away, of an embodiment of the invention, exposing the interior structure thereof.
Figure 3:
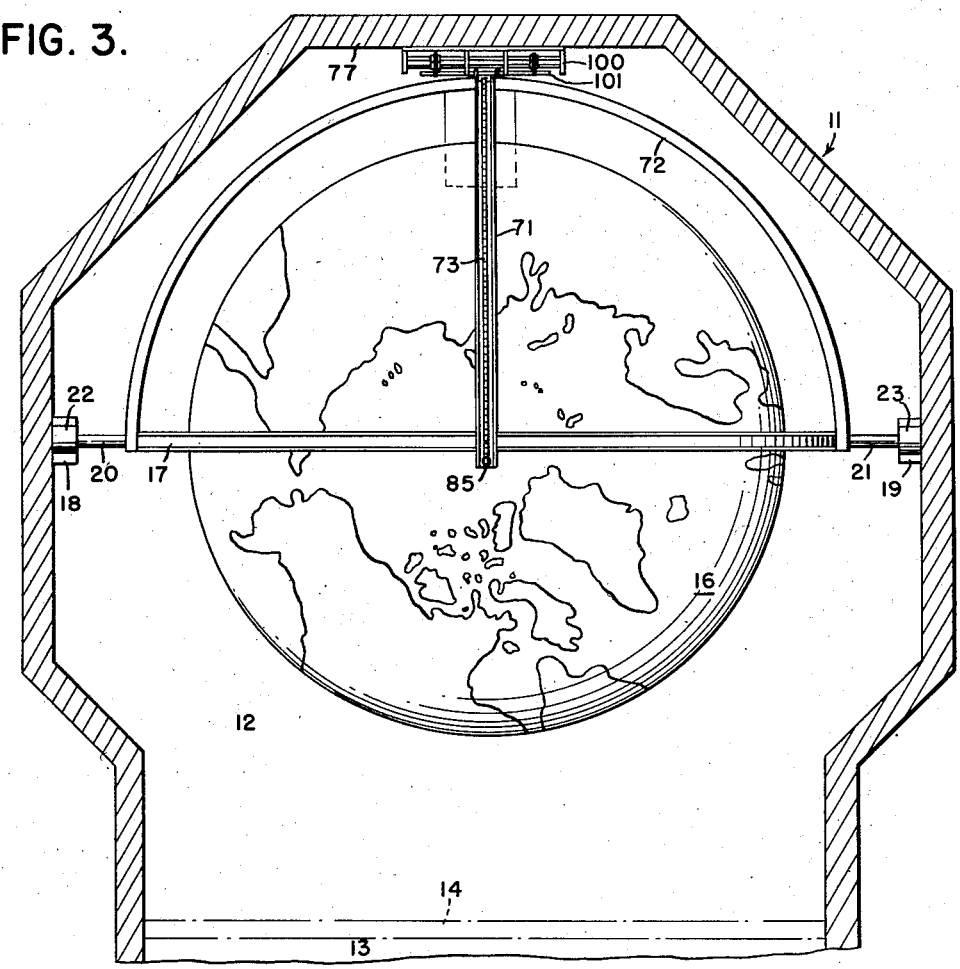
Fig. 3 is a top plan view of the embodiment with the top part of the housing removed above the line 3—3 of Fig. 1.
Figure 6:
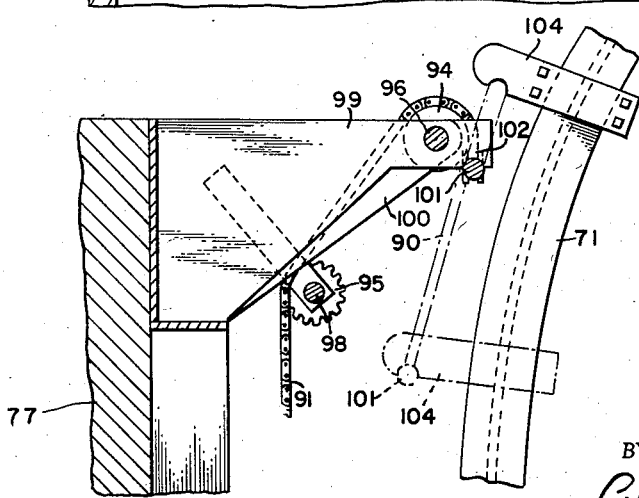
Fig. 6 is a sectional view along the line 6—6 of Fig. 5 but on a larger scale, showing the transfer means for the counterbalancing system.
Figure 5:
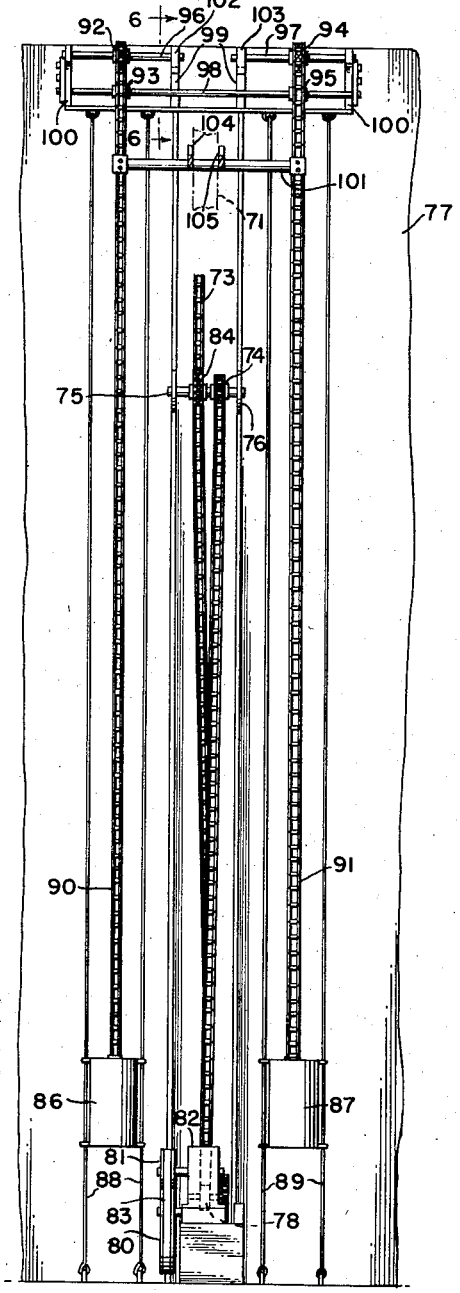
Fig. 5 is an elevational view, partly in section, taken from the line 5—5 of Fig. 4.
Figure 4:
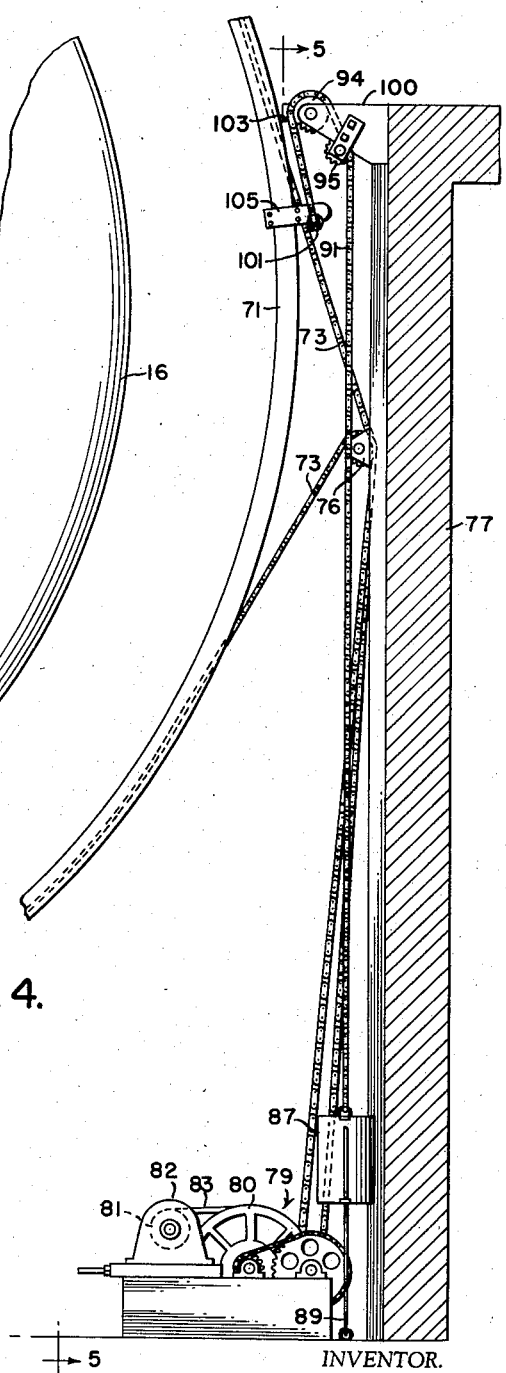
Fig. 4 is a fragmentary view of the drive mechanism for rotating the gimbal member and the counterbalancing means used.
Figure 7:
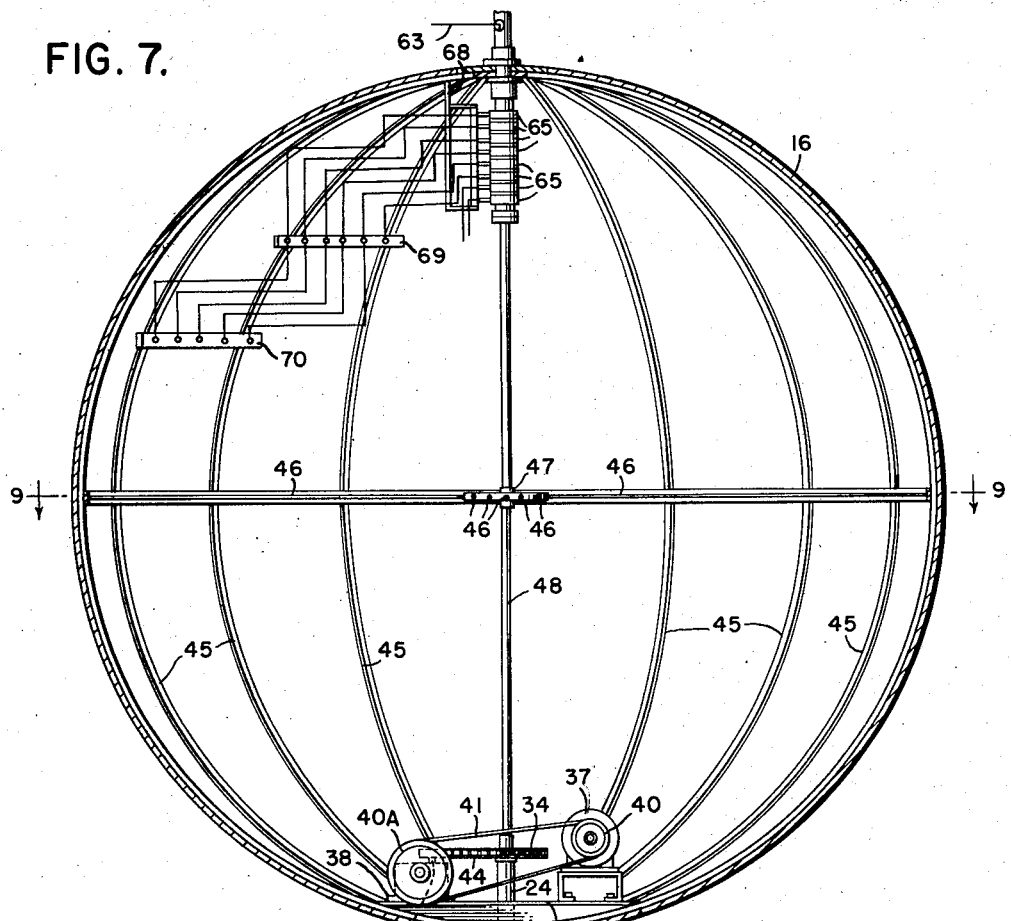
Fig. 7 is a vertical sectional view through the globe member.

Referring with more particularity to the drawing in which like numerals designate like parts throughout the several views, the embodiment illustrated comprises a housing 11 having a stage section 12 and a contiguous observation section or auditorium space 13, separated by a draw curtain 14 or other suitable movable partition.

The roof 15 of the housing above the space 12 is preferably dome-shaped and its interior surface forming the ceiling is preferably painted and lighted or otherwise decorated to similate the heavens.

Within the stage space 12 where is mounted a huge globe 16 of the earth, although a globe of some other planet for any special purpose may also be used. The globe 16 is rotatably mounted in a gimbal ring 17 on a vertical axis by means hereinafter more fully explained, and the gimbal ring is rotatably mounted on top of a pair of structural columns 18 and 19 on either side of the stage section, by means of horizontal shafts 20 and 21 secured to and projecting outwardly from diametrically opposite points of the gimbal ring, said shafts being set to rotate in bearings 22 and 23 that are secured to the columns 18 and 19, respectively. As a result of these mountings, the globe 16 has two degrees of freedom permitting it to be rotated about (1) a vertical axis and (2) a horizontal axis.

Means for rotating the globe about the vertical axis is disposed on the inside of the globe and means for rotating the globe on the horizontal axis is on the exterior of the globe.

Considering first the means for rotating the globe about the vertical axis, a stationary shaft 24 passes through the bottom of the globe and its lower end is welded or otherwise firmly secured to the gimbal ring 17. The hub of the globe at this point has a flanged internal part 25 and a flanged external part 26 which are rotatably mounted on the shaft 24 and they straddle the globe together with a reinforcing plate 27 therefor. Bolts 28 pass through the flanges of these hub parts as well as the reinforcing plate 27 and the adjacent part of the globe and hold all of these members together securely.

A portion of the shaft 24 on the exterior of the globe has an enlarged diameter to form an upwardly facing shoulder 29 which supports a thrust collar 30. Between the collar 30 and the outer hub part 26, anti-friction bearings 31 are provided in matching grooves 32 and 33 of the collar 30 and the hub part 26.

On the interior of the globe, the shaft 24 at a point spaced above the hub part 25, is provided with a bull sprocket wheel 34. This sprocket wheel 34 is fixed to the shaft 24, and hence against rotation, by means of a set screw 35.

A base support member 36 is set on the bottom of the globe and secured to the hub part 25 and reinforcing plate 27 so as to rotate with the globe relative to the shaft 24. This base member 36 carries an electric motor 37 on one side and a speed reduction gear unit 38 on the other. The motor 37 has a take-off pulley 40 which is geared to the input pulley 40A of the unit 38 by means of a belt 41. An output shaft 42 of the unit 38 is provided with a sprocket wheel 43 in the same plane as the bull sprocket wheel 34 and these two sprocket wheels are connected by a sprocket chain 44.

As a result of this arrangement, rotation of the sprocket wheel 43 applies a resultant rotational force through the sprocket chain 44 which causes the globe 16 to rotate about the shaft 24.

Figure 8:
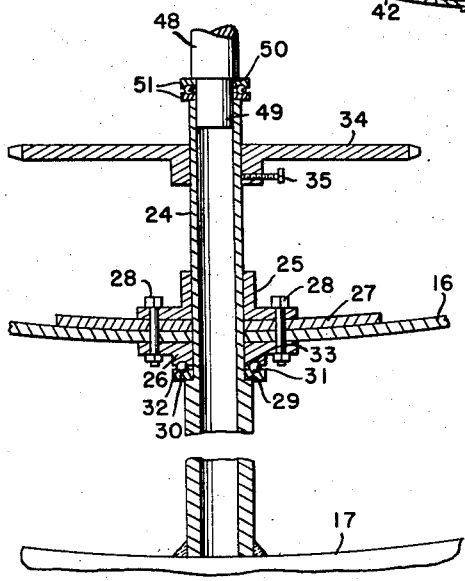
Fig. 8 is a vertical sectional view through the globe showing, on an enlarged scale, the means for rotating the globe about the vertical axis.
Figure 9:
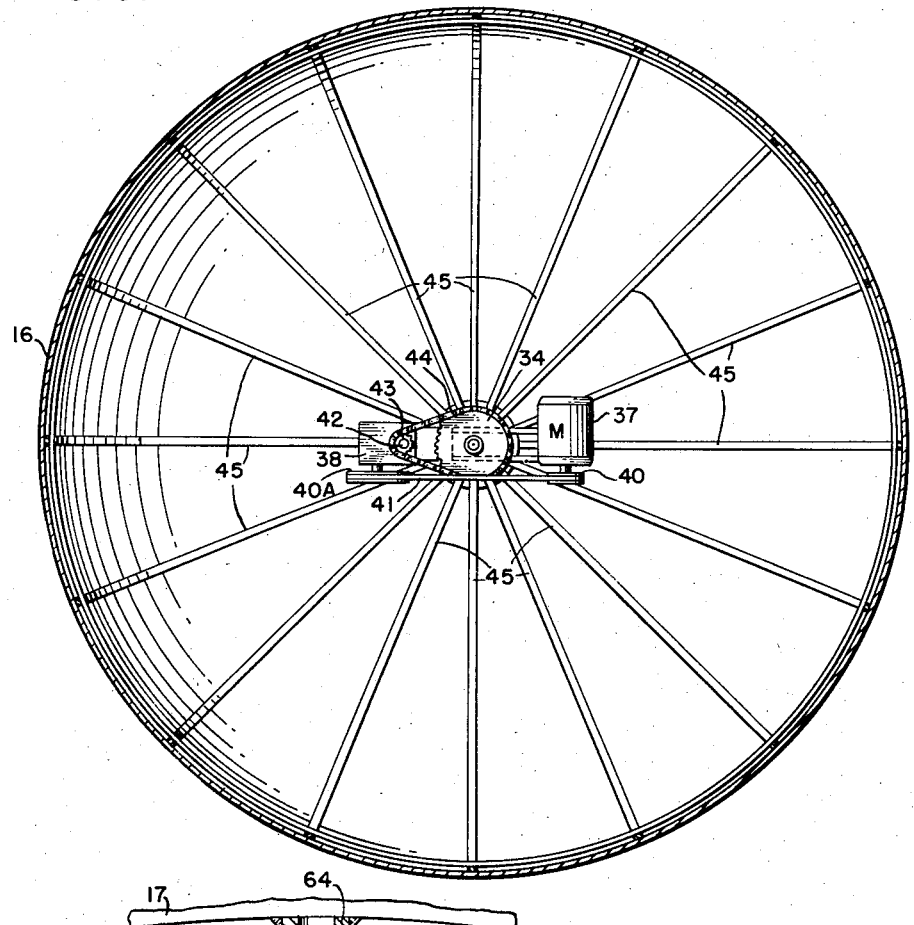
Fig. 9 is a horizontal plan section of the globe along the line 9—9 of Fig. 7.

The globe 16 itself is made of any suitable material, but preferably of a rigid transparent plastic material of any of the customary commercial types known and it is reinforced by interior surface ribs 45 extending between the poles of the globe. Reinforcing spokes 46 at the center of the globe are also provided radiating from a collar 47 on a shaft 48. The lower end 49 of the shaft 48 is recessed to provide a downwardly facing shoulder 50 which bears downwardly against a thrust bearing assembly 51 mounted on top of the stationary shaft 24. At least the upper part of the shaft 24 is made hollow to receive the lower recessed end 49, although the entire shaft 24 may be made hollow, as shown in Fig. 8, if desired.

The shaft 48 extends upwardly to a point above the collar 47 and it has a recessed top 49A to provide an upwardly facing shoulder 50A that supports a thrust bearing 52 for the lower end of a hollow shaft 53. The shaft 53 passes through the globe, a reinforcing plate 54, an interior flanged hub part 55 and an exterior flanged hub part 56. These hub parts are secured to each other and to the globe and reinforcing plate 54 by means of bolts 57. The upper end of the shaft 53 is welded or otherwise secured to the gimbal ring 17. It also has an enlarged portion 58 to provide a downwardly facing shoulder 59 which rests on a collar 60. Ball bearings are disposed between the collar 60 and the upper end of the exterior hub part 56 in complementary races 61 and 62.

Figure 10:
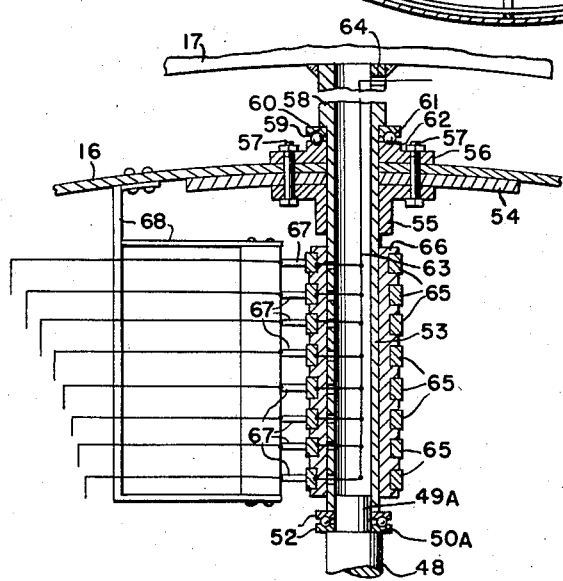
Fig. 10 is a view partly in section and partly diagrammatic of the electric transfer elements within the globe.

Electric current for the interior of the globe is provided by passing electrical wires 63 through an aperture 64 on the exterior of the hollow shaft 53. These wires are connected to commutator rings 65 set in a cylinder 66 of an insulating material, such as Bakelite or other plastic material commonly used for electrical insulating purposes. The cylinder 66 is carried on and rotates with the shaft 53. Commutator brushes 67 engage the rings 65 and are carried on a bracket 68 that is secured to the inner side of the globe wall, substantially as shown in Fig. 10.

Wires leading from these brushes may be used for carrying current to any point on the inside of the globe. For example, rows of electric lights 69 and 70 used for demonstration purposes in a lecture. Electric current for the electric motor 37 may also be provided through this medium.

For rotating the gimbal ring 17 on the bearings 22 and 23, there is provided a semi-circular I-beam 71 or other suitable structural member, the ends of which are secured to the gimbal ring 17 at the poles of the vertical axis of rotation of the globe on the gimbal ring. This semi-circular member 71 is braced by another semi-circular beam 72 at right angles to the beam 71, the ends of the beam 72 being secured to the gimbal ring 17 at its horizontal axis of rotation, substantially as shown.

A sprocket chain 73 has one of its ends secured to one end of the beam 71. From this point, the chain 73 extends longitudinally along the beam until it reaches the rear of the building, whence it passes over one or two idler sprockets 74 on a shaft 75 carried on a bracket 76 attached to the rear wall 77 of the building. The sprocket chain then passes downwardly under an output sprocket wheel 78 of a speed reduction gear unit 79.

The input of the unit 79 is a pulley 80 which is geared to the pulley 81 on the power take-off shaft of a reversible electric motor 82, by means of a belt 83.

From the sprocket wheel 78, the chain 73 passes upwardly and over the second idler sprocket 84 on the shaft 75 and thence along the outer face of the beam 71 in the direction opposite to the point at which the first end of the chain 73 was fixed to the beam. The chain terminates at the opposite end of the beam 71 and it is fixed thereto by a bolt 85 or any other suitable means.

As a result of this arrangement, rotation of the sprocket wheel 78 by the motor 82 in one direction or the other causes a corresponding rotation of the gimbal ring 17.

In certain positions of rotation of the gimbal ring, the weight of the beams 71 and 72, as well as of the motor 37 and reduction gear unit 38 were found to provide an objectional imbalance of forces tending to rotate the gimbal ring clockwise, as viewed in Fig. 1. However, in other positions of rotation of the gimbal ring, such as when the beams 71 and 72 are at the top, the forces are more nearly balanced. Consequently, to counterbalance the objectionable forces for all positions of the gimbal ring, except the latter, counterbalancing weights 86 and 87 are provided. Pairs of vertical guide wires 88 and 89 are provided for these weights. The weights themselves are each attached to one end of a sprocket chain 90 and 91, respectively, and these chains each ride over one of a pair of sprockets 92, 93 and 94, 95 on shafts 96, 97 and 98. These shafts are held on inner and outer pairs of brackets 99 and 100 at an upper part of the rear wall 77 of the housing. The other ends of the chains 90 and 91 are connected to a bar or baton 101 which is disposed at all times in either one of the other of a pair of cradles each formed by a pair of inverted hooks. One pair of the hooks 102 and 103 are secured to and project forwardly from the inner brackets 99. The other pair of hooks 104 and 105 are secured to the beam 71 and overhang it rearwardly so that its orbit of revolution, when the gimbal ring 17 is rotated on the horizonal axis, intersects the locus of the baton 101 in the hooks 102 and 103, whereby a transfer of the baton between the two pairs of inverted hooks takes place each time the hooks 104 and 105 passes the hooks 102 and 103.

When the baton 101 is held in the hooks 104 and 105, the weights 86 and 87 acting through the chains 90 and 91, exert an upward counterbalancing force against the beam 71, but when the baton reposes in the hooks 102 and 103, this counterbalancing force is released from the beam 71.

The globe is preferably coated with a material or materials that are luminescent under ultra violet light. In the presence of such light, the size and glow of the globe furnishes an awe-inspiring vision which is not only attractive, but conducive to the learing of subject matter related to geography depicted on the globe.

The globe may be used as a screen for showing a projection of moving pictures relating to a particular part of the globe. For example, a moving picture of a particular city may be projected on the surface of the globe at the location of the city thereon. The moving picture may start with the projection of a mere dot or small circle at the geographical location of the city on the globe, and then change to actual scenes within the city, such as, first the outside and then the inside of a building of special interest followed by scenes of activity therein. In this manner, the positive association of the city with its position on the globe is made in much the same manner as it would be if the viewer actually made a trip to the city.

Having thus described my invention, I claim:

1. In combination, a globe, a shaft rotatably supporting the globe, a gimbal ring supporting the shaft, means supported by the gimbal ring for rotating the globe on the shaft, means rotatably supporting the gimbal ring about an axis perpendicular to the axis of the shaft, a semi-circular member secured to the gimbal ring in a plane passing through the shaft at right angles to the plane of the gimbal ring, and means connected to the opposite ends of said semi-circular member for selectively applying forces to rotate the gimbal ring about its axis of rotation.

2. The combination of a globe, a shaft rotatably supporting the globe, a gimbal ring supporting the shaft, means supported by the gimbal ring for rotating the globe on the shaft, means rotatably supporting the gimbal ring about an axis perpendicular to the axis of the shaft, means, including a semi-circular member connected to one side of the gimbal ring for rotating the gimbal ring about said axis, means adjacent the semi-circular member for counterbalancing the effect of its weight on the gimbal ring, said counterbalancing means comprising stationary inverted hooks forming a stationary inverted cradle adjacent the gimbal ring, stationary pulleys above said hooks, cables passing over said pulleys, counterweights connected to one end of each of said cables, a bar attached to the other ends of the cables below and in alignment with said hooks, inverted hooks carried by the semi-circular member to move with the gimbal ring in a circular path and being presented as a movable inverted cradle, said movable inverted cradle being disposed to contact the bar when the bar is disposed in said stationary cradle and remove it from the stationary cradle in one direction of rotation of the gimbal and to return it to the stationary cradle when the gimbal ring is subsequently rotated in the opposite direction.

3. A global exhibitor comprising members forming a housing having a stage space and an adjoining auditorium space, a globe in the stage space, the diameter of the globe being larger than the heights of adult persons, a shaft rotatably supporting said globe, a gimbal ring supporting said shaft, means carried by the gimbal ring for rotating said globe, means supporting the gimbal ring in said stage space for rotation on an axis perpendicular to the longitudinal axis of the shaft, means for rotating the gimbal ring about said perpendicular axis, said means including a semi-circular member in a vertical plane connected to one side of the gimbal ring, and means adjacent the semi-circular member for counterbalancing the effect of its weight on the gimbal ring.

References Cited in the file of this patent

UNITED STATES PATENTS

| | | |
|---|---|---|
| 1,042,455 | Manson | Oct. 29, 1912 |
| 1,042,456 | Manson | Oct. 29, 1912 |
| 2,140,326 | Morse | Dec. 13, 1938 |
| 2,477,027 | Wenberg | July 26, 1949 |
| 2,483,216 | Marshall | Sept. 27, 1949 |
| 2,532,402 | Herbold | Dec. 5, 1950 |